(12) United States Patent
Koros et al.

(10) Patent No.: US 8,242,214 B2
(45) Date of Patent: Aug. 14, 2012

(54) POLYMERIC SORBENTS FOR REMOVING LOW LEVEL CONTAMINANTS

(75) Inventors: William John Koros, Atlanta, GA (US); Wulin Qiu, Snellville, GA (US); Kuang Zhang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 271 days.

(21) Appl. No.: 12/713,519

(22) Filed: Feb. 26, 2010

(65) Prior Publication Data

US 2011/0210073 A1     Sep. 1, 2011

(51) Int. Cl.
*B01J 20/26* (2006.01)
*B01J 49/00* (2006.01)
*C08F 124/00* (2006.01)

(52) U.S. Cl. ............... 525/327.3; 210/670; 210/674; 502/402

(58) Field of Classification Search ............ None
See application file for complete search history.

(56) References Cited

OTHER PUBLICATIONS

Qiu et al., "Macroporous polymeric sorbents with high selectivity for separation of phenols," Polymer, vol. 51, Apr. 2, 2010, pp. 3793-3800.*

Vicklund et al., ""Molded" Macroporous Poly(glycidyl methacrylate-co-trimethylolpropane . . . ", 9 Chem. Mater. (1997), pp. 463-471.
Qi et al., "Synthesis and Borate Uptake of Two Novel Chelating Resins", 41 Ind. Eng. Chem. Res. (2002), pp. 133-138.
Qi et al., "Porous Properties of Poly(glycidyl methacrylate-co-trimethylolpropane . . . ", 83 J. Appl. Pol. Sci. (2002), pp. 2374-2381.
Walenius et al., "Synthesis and Characterizartion of Copolymers of Trimethylolpropane . . . ", 17 Reac. Poly. (1992), pp. 309-323.
Walenius et al., "Reaction of the epoxide groups of the copolymer trimethylolpropane trimethacrylate-glycidyl methacrylate . . . ", 23 Br. Polym. J. (1990), pp. 67-70.

* cited by examiner

*Primary Examiner* — Robert Sellers
(74) *Attorney, Agent, or Firm* — Melissa Patangia; Christopher D. Northcutt; Gregory L. Porter (57) ABSTRACT

The present invention relates to functionalized polymeric sorbents and processes of employing them to remove low level contaminants from fluid streams. Poly(glycidyl methacrylate-co-trimethylolpropane trimethacrylate) functionalized with a compound having the structure $NH_2-R_1OH$ wherein $R_1$ is a substituted or unsubstituted phenylene may be particularly useful to remove low levels of phenol compounds from, for example, an aqueous fluid stream comprising one or more sugars such as results from a hydrolysis of lignocellulosic materials.

9 Claims, 12 Drawing Sheets

POLYMERIC SORBENTS FOR REMOVING LOW LEVEL CONTAMINANTS

FIELD OF THE INVENTION

The instant invention relates to functionalized polymeric sorbents and processes of employing them to remove low level contaminants from fluid streams.

BACKGROUND AND SUMMARY OF THE INVENTION

Bio-ethanol is an alternative fuel to gasoline that can be obtained by conversion of sugars, starch, and various lignocellulosic biomass such as woods, herbaceous crops, agricultural residues, waste paper, and other fractions of municipal solid waste. Lignocellulosic materials contain cellulose and hemicellulose that are bound together by lignin, and both cellulose and hemicellulose are polymers built up by long chains of sugar monomers. After pretreatment and hydrolysis these sugars can be converted into ethanol by fermentation. During hydrolysis of lignocellulosic materials with water or dilute acid under high temperature, lignin phenol monomers, such as 4-propyl-2-methoxyphenol (PMP), are often created from the hydrolysis of lignin and can inhibit the desired fermentation of monosaccharides into ethanol. Removal of inhibitors can, therefore, increase significantly the yield of bio-ethanol. Unfortunately, such selective inhibitor removal is limited by a lack of available separation techniques. Due to the high boiling point, larger molecular size, and low concentration of PMP, as well as strong interaction between enzyme and PMP, it is difficult to remove PMP from the hydrolysis solution via conventional technologies. Moreover, selectivity is a key need, since removal of PMP shouldn't cause loss of useful components such as sugar, other oligo- and monosaccharides, and ethanol in the hydrolyzed solution. Thus, an engineered sorption technology with high selectivity is needed.

Besides this biotechnological application, phenolic compounds such as phenol, chlorophenol, etc. also exist in many industrial effluents such as those from oil refineries, coal processing, pharmaceutical, plastics, paint, leather, paper pulp, and steel industries. These recalcitrant and non-biodegradable organics accumulate in water and may contaminate underground sources irreversibly. The continuous consumption of water containing organic contaminant in excess of a few parts per billion (ppb) could lead to serious health problems depending on the type of the pollutant. Phenol can be easily absorbed through respiratory organ, skin, and alimentary canal of human being, is highly toxic to albumen, liver and nephridium, and can restrain also the central neural system. And chlorophenols may be carcinogenic. Therefore, separation and recovery of phenolic compounds from waste is often important for environmental protection, industrial safety, and process economics.

Accordingly, what is needed are sorbents and sorbent processes which are useful to separate low levels of contaminants from a fluid stream. It would further be desirable if such sorbents and processes could accommodate a solute favorably while allowing subsequent desorption without destruction of the sorbent. It would further be advantageous if such sorbents were useful to separate methoxyphenols in a hydrolyzed solution of biomass with good sorption selectivity.

Advantageously, sorbents and sorbent processes which are useful to separate low levels of contaminants from a fluid stream have been discovered. The sorbents and processes can accommodate a solute favorably while allowing subsequent desorption without destruction of the sorbent. The sorbents are useful to separate, for example, methoxyphenols in a hydrolyzed solution of biomass with good sorption selectivity.

In one embodiment the invention pertains to a composition comprising a functionalized poly(glycidyl methacrylate-co-trimethylolpropane trimethacrylate). The instant functionalized poly(glycidyl methacrylate-co-trimethylolpropane trimethacrylate) polymers are unlike those functionalized with an aliphatic amine such as described at, for example, M. Walenius and P. Flodin, "Reaction of the epoxide groups of the copolymer trimethylolpropane trimethacrylate-glycidyl methacrylate with aliphatic amino compounds", Br. Polym. J., 23 (1990) 67. Instead, the instant invention comprises poly(glycidyl methacrylate-co-trimethylolpropane trimethacrylate) functionalized with a non-aliphatic amine compound such as one having the structure $NH_2$—$R_1OH$ wherein $R_1$ is a substituted or unsubstituted phenylene.

In another embodiment, the instant invention pertains to a method of reducing the amount of one or more low level contaminants of a fluid stream. The method comprises contacting the fluid stream comprising an initial concentration of one or more low level contaminants with one or more suitably functionalized poly(glycidyl methacrylate-co-trimethylolpropane trimethacrylate) sorbents. The contacting is conducted in a manner such that the initial concentration of one or more low level contaminants in the fluid stream is reduced by sorption of said one or more low level contaminants on said sorbent. The process next comprises desorbing one or more functionalized poly(glycidyl methacrylate-co-trimethylolpropane trimethacrylate) sorbents by passing a regenerating fluid over said sorbents.

DETAILED DESCRIPTION OF THE INVENTION

In general terms, the instant invention pertains to functionalized polymeric sorbents and processes of employing them to remove low level contaminants from fluid streams. In one embodiment such a useful composition comprising poly(glycidyl methacrylate-co-trimethylolpropane trimethacrylate) functionalized with a suitable compound. The suitable compound varies depending upon how the functionalized polymer will be employed. One particularly suitable compound has the structure $NH_2$—Ar—R wherein Ar is a substituted or unsubstituted benzene or other aromatic ring such as naphthalene and R can be one or more substituents of hydrogen, alkoxy, alkyl, alkenyl, alkynyl, aryl, hydroxyl, halogen, aldehyde, carboxyl, cyanogen, nitryl, sulphonyl, mercaptide, mercapto, phenyl, etc. Compounds wherein R is hydroxyl group is particularly suitable if the composition is to be employed to remove, for example, a phenol compound or mixture of phenolic compounds from a fluid stream. In one specific embodiment the composition comprises poly(glycidyl methacrylate-co-trimethylolpropane trimethacrylate) functionalized with 5-amino-2-methoxyphenol.

The functionalized poly(glycidyl methacrylate-co-trimethylolpropane trimethacrylate) may be made in any convenient manner. Typically, the polymer, i.e., poly(glycidyl methacrylate-co-trimethylolpropane trimethacrylate) is made first followed by a functionalization step. However, depending upon the specific compound, it may be possible to make the functionalized poly(glycidyl methacrylate-co-trimethylolpropane trimethacrylate) directly.

Poly(glycidyl methacrylate-co-trimethylolpropane trimethacrylate) may be made in any convenient manner. A number of ways such as suspension polymerization and photoinitiated polymerization have been described in the literature and may be employed herein. For example, exemplary methods of making poly(glycidyl methacrylate-co-trimethylolpropane trimethacrylate) that may be employed herein include those described in the example below, as well as, in Qi, T.; Sonoda, A.; Markita, Y.; Kanoh, H.; Ooi, K.; Hirotsu, T. *J. Appl. Polym. Sci.* 2002, 83, 2374-2381; Qi, T.; Sonoda, A.; Markita, Y.; Kanoh, H.; Ooi, K.; Hirotsu, T. Ind. Eng. Chem. Res. 2002, 41, 133-138; Walenius, M.; Kulin, L. I.; Flodin, P. *React. Polym.* 1992, 17, 309-323; C. Viklund et al., "Molded Macroporous *Poly(Glycidyl Methacrylate-Co-Trimethylolpropane Trimethacrylate)* Materials with Fine Controlled Porous Properties: Preparation of Monoliths Using Photoinitiated Polymerization," *Chem. Mater.*, vol. 9, No. 2, 1997, pp. 463-471.

Usually, these types of sorbents are crosslinked using, for example, a moiety which has two or more double bonds such as trimethylolpropane trimethacrylate monomer during the synthesis of the polymer. The molecular weight is often nearly infinite and the polymer has no melting point. The sorbent pore volume, pore size distribution, and specific surface area of the beads varies depending upon process conditions, e.g., amount and type of porogen, the glycidyl methacrylate content, etc. Typically, the pore volume is anywhere from about 0.1 to about 2 $cm^3/g$ while the surface area may range from about 1 to about 500 $m^2/g$. The ratio of monomer, i.e., glycidyl methacrylate to trimethylolpropane trimethacrylate, can be varied. For example, the glycidyl methacrylate mole fraction may be from about 10 to about 90% depending upon the desired characteristics and application. In general, a higher glycidyl methacrylate fraction provides more functionality but may have poorer mechanical properties.

Once the poly(glycidyl methacrylate-co-trimethylolpropane trimethacrylate) has been made it can be functionalized in any convenient manner. The specific functionalization process may vary depending upon the specific characteristics of the poly(glycidyl methacrylate-co-trimethylolpropane trimethacrylate) such as the monomer unit ratio. The specific process employed may also vary depending upon the specific functionalizing compound employed. Generally, any functionalizing compound capable of a ring opening epoxidation reaction may be employed. This includes functionalizing compounds such as phenols like $NH_2$—Ar—OH wherein Ar is a substituted or unsubstituted aromatic ring or even an appropriate heterocycle such as a heteroaryl.

Generally, the poly(glycidyl methacrylate-co-trimethylolpropane trimethacrylate) is contacted with the functionalizing compound under conditions to open the epoxy ring and add the functionalized compound to the polymer. Such conditions vary but typically comprise first soaking or immersing the polymer in a solution comprising the functionalizing compound. Next, the polymer soaked with functionalizing compound is heated to a temperature for a time sufficient to form the functionalized poly(glycidyl methacrylate-co-trimethylolpropane trimethacrylate). The resulting functionalized polymer product may be purified in any convenient manner such as filtering, washing, and drying in an inert atmosphere.

If the functionalized poly(glycidyl methacrylate-co-trimethylolpropane trimethacrylate) is to be employed in a process to remove contaminants then generally a compound which is structurally similar to the contaminant is used as the functionalizing compound. To determine whether the functionalized polymer will be useful to remove a given contaminant, then it may helpful to determine if the functionalizing compound and contaminant have similar or analogous chemical structures, i.e., like sorbs like. A table of useful functionalizing compounds and the contaminants it is believed that each may be capable removing is below.

| Functionalizing compound | Contaminants |
| --- | --- |
| $NH_2$—Ar—OH wherein Ar is a substituted or unsubstituted phenylene or other divalent aromatic ring such as naphthalene, etc. | Phenolic compounds such as 2-methoxy-4-propylphenol, phenol, phenol substituted with one or more halogens, and mixtures thereof. |
| NH2—Ar—$NO_2$ wherein Ar is a substituted or unsubstituted phenylene or other divalent aromatic ring such as naphthalene, etc. | Compounds comprising one or more $NO_2$ groups such as nitrobenzene. |
| $NH_2$—Ar—OMe wherein Ar is a substituted or unsubstituted phenylene or other divalent aromatic ring such as naphthalene, etc | Compounds comprising one or more methoxy groups such as mono-, di-, and/or tri-substituted methoxy benzene |

| Functionalizing compound | Contaminants |
| --- | --- |
| $NH_2$—Ar wherein Ar is a substituted or unsubstituted heterocyclics. | Compounds comprising one or more amino group such as 2-aminopyridine, 2-aminoquinoline, 5-Amino-1-naphthol, 6-Amino-4-hydroxy-2-naphthalenesulfonic acid, and congo red. |
| $NH_2$—Ar—$SO_3H$ wherein Ar is a substituted or unsubstituted phenylene or other divalent aromatic ring such as naphthalene, etc | Compounds comprising one or more $SO_3H$ groups such as p-aniline sulfonic acid. |
| $NH_2$—Ar—X wherein Ar is a substituted or unsubstituted phenylene or other divalent aromatic ring such as naphthalene, etc. and X is halogen. | Compounds comprising one or more halogens such as 4-chloroaniline. |
| $NH_2$—Ar—SH wherein Ar is a substituted or unsubstituted phenylene or other divalent aromatic ring such as naphthalene, etc. | Compounds comprising one or more —SH groups such as 4-aminothiophenol. |

The functionalized poly(glycidyl methacrylate-co-trimethylolpropane trimethacrylate) may be made in any form and/or size suitable for the desired application. For example, for removal of contaminants it is often useful that the functionalized poly(glycidyl methacrylate-co-trimethylolpropane trimethacrylate) be in the form of a macroporous bead or a hollow fiber. The size may vary depending upon the specific application. For example, for removal of one or more phenols from a saccharide solution using poly(glycidyl methacrylate-co-trimethylolpropane trimethacrylate) functionalized with a compound having the structure $NH_2$—$R_1OH$ wherein $R_1$ is a substituted or unsubstituted phenylene, it has been found that it is particularly useful to employ a functionalized polymer wherein at least about 95% by weight of the functionalized polymer has a particle size of less than about 850 micrometers.

Surprisingly, the functionalized poly(glycidyl methacrylate-co-trimethylolpropane trimethacrylate) often have unexpectedly high decomposition temperatures. In some instances the decomposition temperatures of the functionalized poly(glycidyl methacrylate-co-trimethylolpropane trimethacrylate) are equal to or even higher than the decomposition temperature of the unfunctionalized poly(glycidyl methacrylate-co-trimethylolpropane trimethacrylate). For example, the decomposition temperature of the poly(glycidyl methacrylate-co-trimethylolpropane trimethacrylate) functionalized with a compound having the structure $NH_2$—$R_1OH$ wherein $R_1$ is a substituted or unsubstituted phenylene is at least about 20° C., preferably at least about 40° C., more preferably at least about 60° C. higher than that of poly(glycidyl methacrylate-co-trimethylolpropane trimethacrylate).

The instant functionalized polymers may have many different uses. One particular use is in a method of reducing the amount of one or more low level contaminants of a fluid stream. Such a method comprises contacting the fluid stream comprising an initial concentration of one or more low level contaminants with one or more functionalized poly(glycidyl methacrylate-co-trimethylolpropane trimethacrylate) sorbents. As described above, the poly(glycidyl methacrylate-co-trimethylolpropane trimethacrylate) sorbent is typically functionalized with a compound 5-amino-2-methoxyphenol which has a similar and/or analogous chemical structure with a potential contaminant such as 4-propyl-2-methoxyphenol to be removed.

The contacting is conducted in a manner such that the initial concentration of one or more low level contaminants in the fluid stream is reduced by sorption of said one or more low level contaminants on said sorbent. The fluid stream is preferably aqeueous. A particularly useful application is contacting the functionalized polymer with an aqueous fluid stream which results from, for example, the hydrolysis of lignocellulosic materials. In such cases the fluid stream is typically an aqueous stream comprising one or more sugars and one or more low level contaminants such as a phenolic compound, i.e., a compound having at least one substituted or unsubstituted phenol group. Typical such phenolic compounds include, for example, a compound selected from the group consisting of 2-methoxy-4-propylphenol, phenol, phenol substituted with one or more halogens, and mixtures thereof In such a case it is preferable to employ a sorbent such as those described above that comprise poly(glycidyl methacrylate-co-trimethylolpropane trimethacrylate) functionalized with a compound having the structure $NH_2$—$R_1OH$ wherein $R_1$ is a substituted or unsubstituted phenylene.

Advantageously, the sorbent can then often be desorbed and used again. This can be accomplished in a number of ways. One convenient way is to pass a suitable regenerating fluid over the sorbent. Any suitable organic solution may be employed and may vary depending on the specific characteristics of the functionalized polymer. For many functionalized polymers, including those polymers functionalized with $NH_2$—$R_1OH$ described above, such solutions may comprise a $C_{1-6}$ alcohol such as methanol, ethanol, or a mixture thereof. The length of desorbing time will likely vary depending upon the specific sorbent, contaminant, and amounts. However, it is usually suitable to pass a solution comprising, for example, ethanol, methanol, or a mixture thereof, over said sorbent for at least about 30 minutes or more.

EXAMPLE 1

Summary

A polymeric sorbent with high selectivity and capacity for phenols in aqueous stream was synthesized based on 5-amino-2-methoxyphenol functionalized poly(glycidyl methacrylate-co-trimethylolpropane trimethacrylate), P(GMA-TRIM)-AMP. In addition to sorption, the materials were studied using solid-stated NMR, Fourier transform infrared (FT-IR), elemental analysis, and scanning electron microscopy (SEM). Well-defined internal micrometer-sized spheres of P(GMA-TRIM)-AMP with stable macropore inner structures surrounded by a thin outer shell. The sorbent has functional groups that are similar in chemical structure to 4-propyl-2-methoxyphenol, PMP, and show high selectivity in removal of PMP from glucose- and xylose-containing monosaccharides solutions in bioethanol production without the loss of the saccharides. The sorbent could also be used to separate phenol and 4-chlorophenol from waste water that contains phenols as low as ppm order. The sorbent is often easily regenerated and exhibits good durability and reusability. It was regenerated and reused at least 10 times without loss in sorption behavior. The example is described in further detail below.

The porous P(GMA-TRIM)-AMP sorbent was based on a "like sorbs like" principle. That is, the sorbent has functional groups similar to 4-propyl-2-methoxyphenol, PMP, in chemical structure and yields high selectivity in removal of PMP from glucose- and xylose-containing saccharide solutions. This capability indicates an application in bio-ethanol production. The resulting sorbent also shows good sorption capacities for other phenols. Overall the results indicate that the idea of making sorbents based on "like sorbs like" is viable for selective separation of specific components from a mixture, resulting in a new method in developing selective sorbents and separation technique. These kinds of sorbents might have analogic or similar chemical structure with the solute to be selectively removed. The sorbents may even be synthesized with the chemical which itself is the target to be removed. To improve the sorption efficiency, it may be useful to make a porous hollow fiber sorbent in lieu of a macroporous bead.

Materials

Glycidyl methacrylate, GMA (Aldrich, 97%); Trimethylolpropane trimethacrylate, TRIM (Aldrich, technical grade); 2,2'-Azobis(2-methylpropionitrile), AIBN (Aldrich, 98%); poly(vinyl pyrrolidone), PVP (Aldrich, average Mw 1,300,000); 5-Amino-2-methoxyphenol, AMP (Aldrich, 98%); Phenol (Sigma, 99.5%), Chlorophenol (Sigma, 99%), and Toluene (Sigma, 99.9%) were used as obtained.

Preparation of Poly(GMA-TRIM)-AMP Porous Sorbents

The porous copolymer beads were first prepared through suspension polymerization, which was composed of an organic phase and an aqueous phase. The ratio of the organic phase to the aqueous phase was 30/70 by volume. The organic phase was composed of GMA and TRIM as monomers, AIBN as initiator, and toluene as a porogen, while the aqueous phase with PVP as a stabilizer dissolved in de-ionized water. The AIBN content was 1% w/v of monomers in organic phase and PVP content was 1% w/v of aqueous phase. The ratio of GMA to TRIM was 5.5/1 (mol). The specific amount of GMA, TRIM, and AIBN were dissolved in toluene to form a transparent organic phase, which was then dropped into the pre-prepared aqueous phase, and kept stirring for 2.5 h in $N_2$ to form a homogeneous dispersion. The polymerization was carried out at 73~75° C. in $N_2$ for 15 h, with stirring of 300 rpm, and the de-ionized water was added to the suspension. The system was then cooled to 50° C. and stirring was ceased to enable sedimentation. The supernatant was decanted and the procedure was repeated until a clear supernatant was obtained. The resulting particles were filtered, washed with de-ionized water and acetone, and purified with acetone, filtered and dried at room temperature for 2 days, then dried in vacuo at 70° C. for 4 days. The white P(GMA-TRIM) copolymer beads were obtained.

An excess amount of AMP was dissolved in NMP at 50° C. under $N_2$ atmosphere, and P(GMA-TRIM) copolymer beads were added and soaked in the AMP solution for 2 days. The reaction was carried out at 80° C. for 15 h, and the resulting product was filtered, washed with NMP, DI water, and acetone. Finally the sample was purified with acetone for 4 days in a Soxhlet extractor and dried under room temperature for 2 days, followed by vacuum at 70° C. for 4 days. The obtained functionalized P(GMA-TRIM)--AMP copolymer beads are a peach color.

Characterization of the Sorbents

Fourier transform infrared (FT-IR) spectra were recorded by means of a Bruker Tensr 27 spectrophotometer using the KBr wafer technique. Solid-state NMR spectra were obtained on a Bruker DSX 400 under CP-MAS conditions. The C, H and N contents of the sorbent were determined by elemental analysis using Vario EL III (Elementar Analysensysteme GmbH, Germany). The particle size of the sorbent was determined using sieves with mesh size of 0.355, 0.500, 0.710, 0.850 and 1.0 mm, respectively. Thermo-stabilities of beads were examined with a TGA Q5000 instrument under a flow of nitrogen, heating from about 30 to 650° C. at a rate of 10° C./min. The overall morphology and the microstructure of the beads were observed on a LEO 1530 thermally-assisted field emission (T-FE) SEM machine at an acceleration voltage of 3.0 kV or 8.0 kV. Samples were used as obtained, crushed, or sectioned using an ultramicrotome, and were surface sputter coated with a thin layer of gold with a thickness ca. 10 nm prior to observation.

Sorption and Desorption Tests

P(GMA-TRIM)-AMP sorbent was tested for sorption of phenol in batch tests. A certain amount of sorbent was added into a plastic-stopper Erlenmeyer flask containing 20 mL phenol solution (the mass of sorbent to the mass of solution was 1/100), and shaken at 25° C. for a specific time period in a shaking water bath (Grand OLS 200 L). The sorption capacity ($Q_c$) of the phenol was calculated using equation (1):

$$Q_c = V_o * (C_o - C_e)/M \qquad (1)$$

where $Q_c$ is the equilibrium sorption capacity (mg/g), $V_o$ is the volume of the phenol solution (L), $C_o$ and $C_e$ are the initial and equilibrium concentration of phenol in solution (mg/L), respectively, and M is the mass of sorbent beads used (g).

The distribution coefficient $K_d$, i.e., the ratio of the concentration of adsorbed phenol in sorbent to the equilibrium concentration of phenol in the solution, is expressed as equation (2):

$$K_d = C_s/C_e \qquad (2)$$

Where Cs is the equilibrium concentration of phenol in sorbent, and is calculated with equation (3):

$$C_s = (C_o - C_e) * V_o/V_s \qquad (3)$$

Where $V_s = M/\rho$, is the volume of sorbent polymer; M is the mass of sorbent, and $\rho$ is the density of the primary submicron particles and shell wall comprising the sorbent polymer. This density was measured as 1.221±0.001 kg/L with a density gradient column at 30° C. (Techne Inc.). The value was determined by allowing more than 20 particles to equilibrate in the column and then using the average of the array of particle position. The range of these positions was fortunately rather small (±1 grid in a column with 70 grids) corresponding to ±0.001 kg/L.

The phenol saturated sorbent beads were filtered, rinsed with DI water, and dried under room temperature for 12 h. Desorption of phenol was carried out by soaking the saturated beads in ethanol and shaking at 25° C. for varied time from 30 min to 24 h in a shaker unit. The desorbed phenols were the same either in 30 min or in 24 h, about 95±5% phenols can be desorbed in 30 min. Therefore 30 min was used in most desorption experiments, and the mass ratio of saturated sorbent to ethanol was kept at 1/100.

The concentration of phenol was determined with a DU® 720 UV-Vis spectrophotometer (Beckman Coulter), using a pre-calibrated curve of UV absorption vs. phenol concentration. The concentration of monosaccharide was determined by a Dionex High Performance Anion Exchange Chromatography (HPAEC) with triple pulse amperometry (PAD) detector, and a CarboPac PA10 anion-exchange column.

Synthesis of Porous Polymer Sorbent

Figure 14:
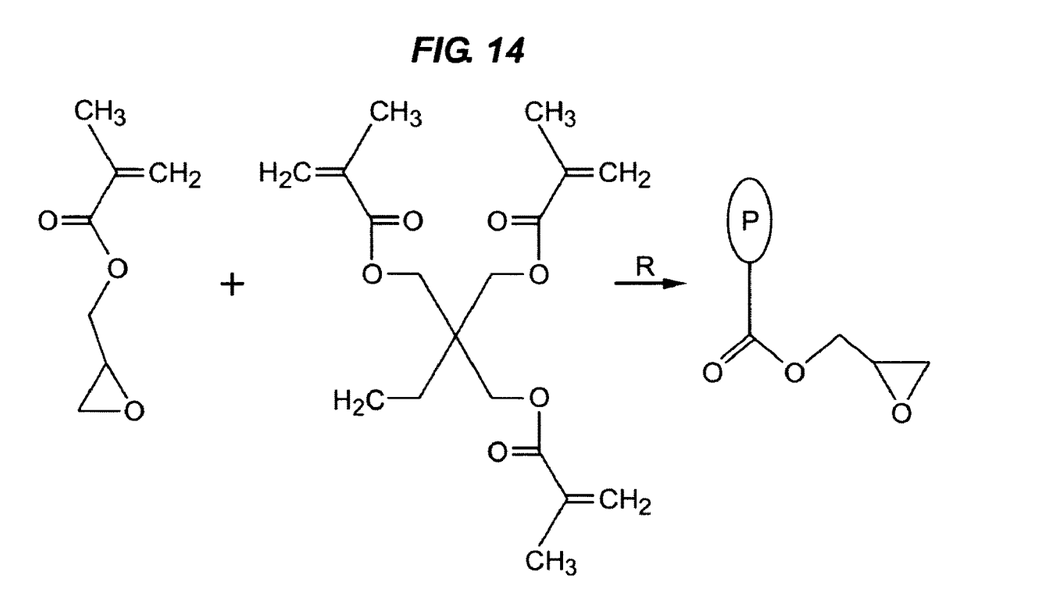
FIG. 14 shows in Scheme 1 the synthesis of P(GMA-TRIM) polymer.
Figure 15:
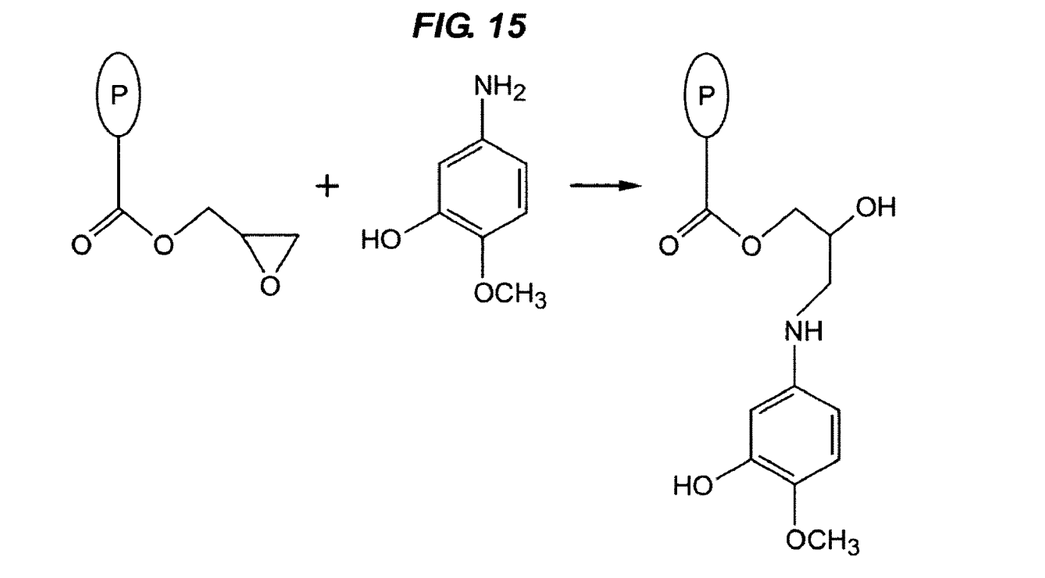
FIG. 15 shows in Scheme 2 the synthesis of P(GMA-TRIM)-AMP sorbent.

P(GMA-TRIM) copolymer porous beads were synthesized through suspension polymerization using GMA and TRIM as monomers, as shown in Scheme 1 in FIG. 14. The TRIM works as a crosslinker and yields the resulting polymeric resins mechanical properties, while GMA provides epoxy groups which are effective for introducing the target groups. The resulting P(GMA-TRIM) copolymer beads were then functionalized by a ring-opening reaction of oxirane with the amino groups of AMP, to produce P(GMA-TRIM)-AMP, as shown in Scheme 2 in FIG. 15, and the AMP functionalized porous polymer beads will be used as selective sorbents to remove phenols from solutions.

The initial monomer ratio of GMA to TRIM was 5.5/1 (mol), thus the theoretical C, H, and O content in polymer is 60.59 wt %, 7.27 wt %, and 32.14 wt %, respectively. The elemental analysis gave the C and H content as 60.27 wt % and 7.65 wt %, and by difference, the O content was 32.08 wt %. These measured elemental fractions in polymer are very close to the corresponding calculations from the initial monomer, indicating that the GMA and TRIM were quantitatively copolymerized to produce P(GMA-TRIM) with the same content of GMA as that in the feed monomers. Therefore, the epoxy group fraction, i.e., the GMA fraction in P(GMA-TRIM) is 85 mol %.

The elemental analysis of the functionalized sorbent, P(GMA-TRIM)-AMP, yielded C, H, and N fraction as 59.44 wt %, 7.04 wt %, and 1.55 wt %, indicating that AMP fraction is 1.11 mmol/g polymer sorbents. The resulting sorbent was used in the subsequent sorption testing.

Figure 1:
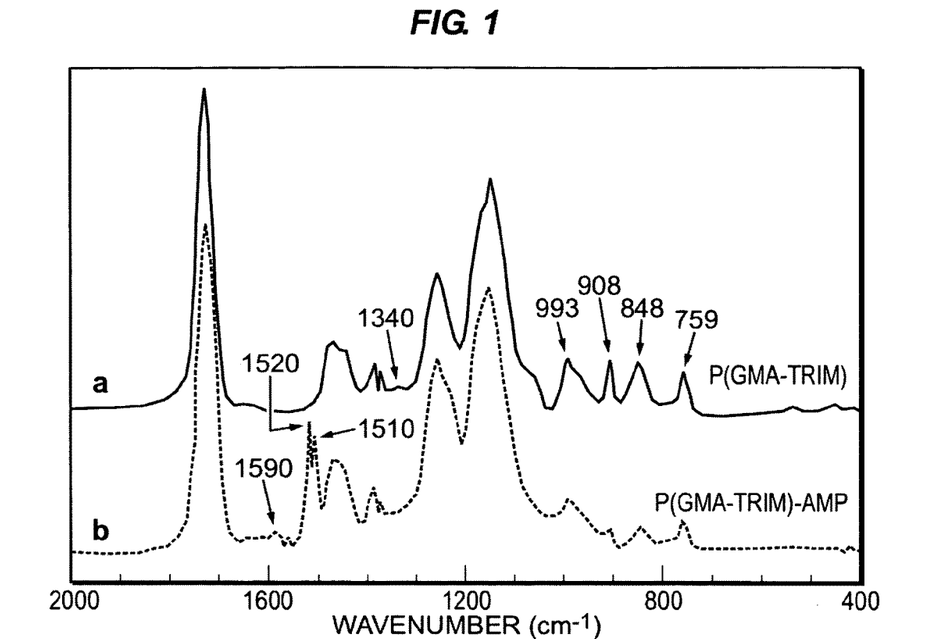
FIG. 1 shows FT-IR spectra of (a) P(GMA-TRIM), and (b) P(GMA-TRIM)-AMP.

FT-IR spectra of the copolymer and the sorbent differ considerably from each other, as shown in FIG. 1. Unlike the spectrum of P(GMA-TRIM), the functionalization of P(GMA-co-TRIM) shows the disappearance of the peak at 1340 $cm^{-1}$ and decrease in absorbance of peaks at the 993, 908, 848 $cm^{-1}$ due to epoxy groups in P(GMA-TRIM), while the new peaks at 1590, 1510, and 1520 $cm^{-1}$ appear due to the benzene groups in P(GMA-TRIM)-AMP, suggesting the successful conversion of the epoxy groups with AMP.

Figure 2:
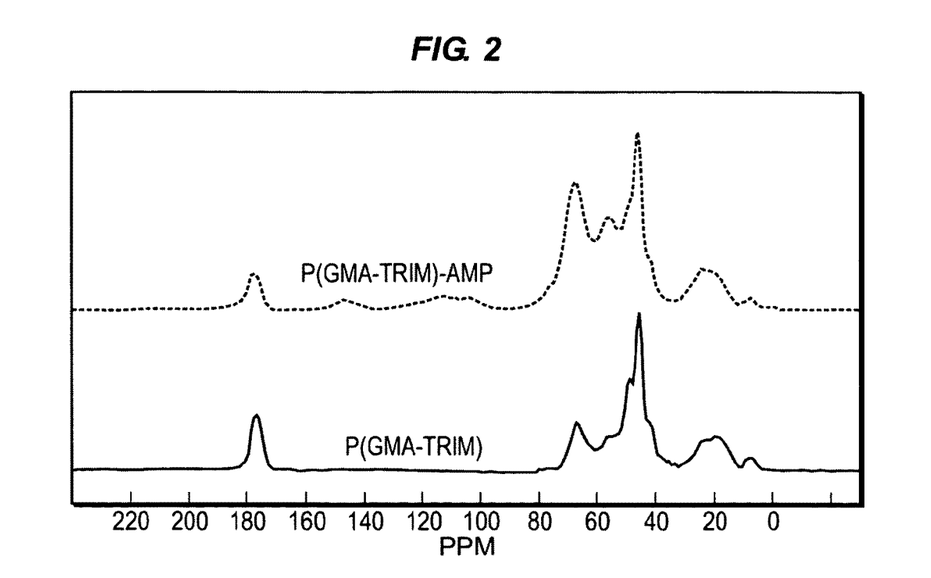
FIG. 2 shows $^{13}C$ CP-MAS NMR spectra of P(GMA-TRIM) and functionalized P(GMA-TRIM)-AMP sorbents.

FIG. 2 shows the solid state $^{13}$C-NMR spectra of P(GMA-TRIM) and P(GMA-TRIM)-AMP. The chemical shift at 166 ppm represents the carbonyl groups conjugated with a double bond, and 176 ppm represents unconjugated ones, i.e. the carbon-carbon double bonds have reacted. No peak at 166 ppm of the unreacted double bonds in P(GMA-co-TRIM) was found, indicating that there are no methacrylate groups left, i.e., the polymerization reaction was carried out thoroughly. Normalizing with respect to that at 176 ppm, the integral at 67.7 ppm in FIG. 2 is 1.32 for P(GMA-TRIM), while it is 6.08 for P(GMA-TRIM)-AMP. The intensity at 67.7 ppm increases after functionalization, indicating that more carbon atoms are attached to hydroxyl groups. The new peaks in the sample of P(GMA-TRIM)-AMP at 100~120 ppm are assigned to the carbon of —$OCH_3$ groups and carbons in benzene, while the peaks at 140~150 ppm are assigned to the carbon of —$OCH_3$ groups in AMP. From the results described above, P(GMA-TRIM)-AMP sorbent was successful synthesized.

Characteristics of the Beads

Figure 3A:
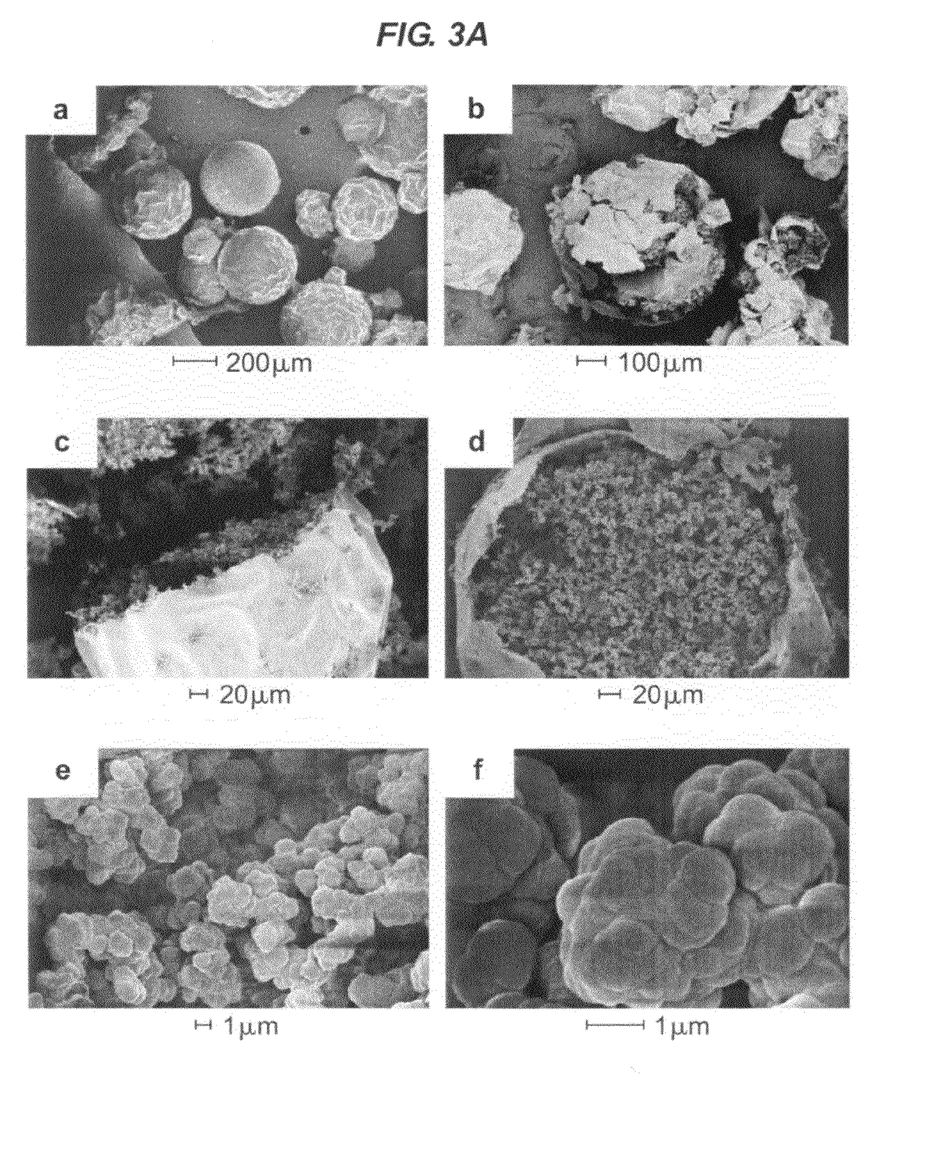
FIGS. 3A and 3B show SEM photographs of (a) beads, (b) crushed beads, (c) and (d) ultramicrotome sectioned sample, (e) and (f) interior structure, (g) a piece of shell, (h) cross section and inner surface of a shell, (i) cross section and out surface of a shell, and (j) cross section of a shell.
Figure 3B:
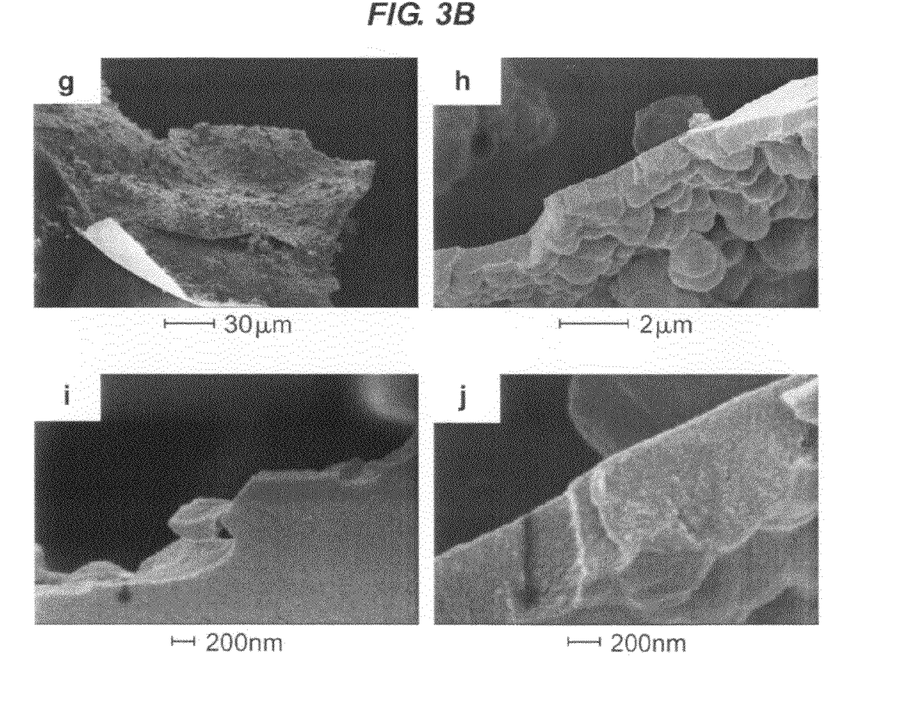

The particle size of polymer beads was measured with testing sieves, and it was found that more than 95 wt % of the polymer beads had particle sizes of less than 850 μm, 70 wt % particles are less than 500 μm, and 45 wt % are smaller than 355 μm. The overall morphology and microstructure of the beads were investigated with scanning electron microscopy (SEM), and shown in FIG. 3. The beads are composed of spherical particles with diameters of a few hundred microns (FIG. 3*a*), and the beads have a shell with porous interior, as shown in FIG. 3*b*-*d*, irrespective of the particle size (FIG. 3*b*). The small spheres (nodules) within the shells have a diameter of ca. 1 μm agglomerated to large entities with diameter of ca. 3.5 μm to form the porous inner structure with a pore size from ~1 μm to ca. 20 μm (FIG. 3*e*-*f*). The borderline of the shell and the interior is obvious (FIG. 3*g*-*h*), and the shell is comprised connected small spheres ca. 1 μm (FIG. 3*h*). As shown in FIG. 3*h*-*j*, the shell appears to be solid with a thickness of ca. 500 to 850 nm. The very small nodules of ca. 20 to 50 nm in FIG. 3*j* likely comprise polymer, gold particles from sputter coating, or a mixture. However, no matter the precise composition of nodules, FIGS. 3*h*-*j* show a dense characteristic of the shell. Sorbent has a macroporous inner structure that is sealed by a thin dense outer shell. This may cause a delay of solute to reach the porous interior as shown by the sorption kinetics discussed hereinafter.

Figure 4:
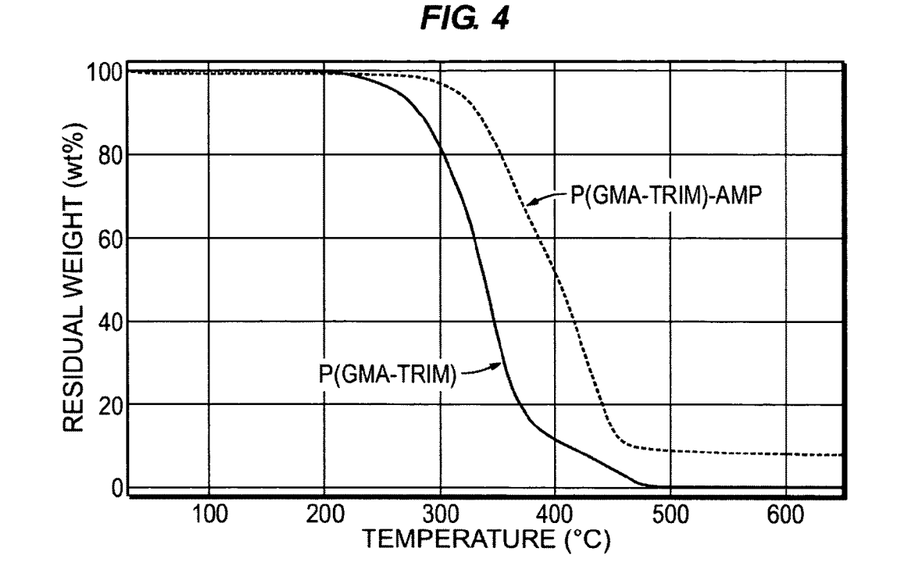
FIG. 4 shows TGA analysis of P(GMA-TRIM) and functionalized P(GMA-TRIM)-AMP sorbents.

The thermal stability of the polymer beads is shown in FIG. 4. P(GMA-TRIM) bead starts to decompose around 230° C., and the thermal stability of the polymer increases with the introduction of the functional groups, i.e., the P(GMA-TRIM)-AMP shows higher initial decomposition temperature near 300° C.

Selective Sorption of 4-Propyl-2-methoxyphenol, PMP

Figure 5:
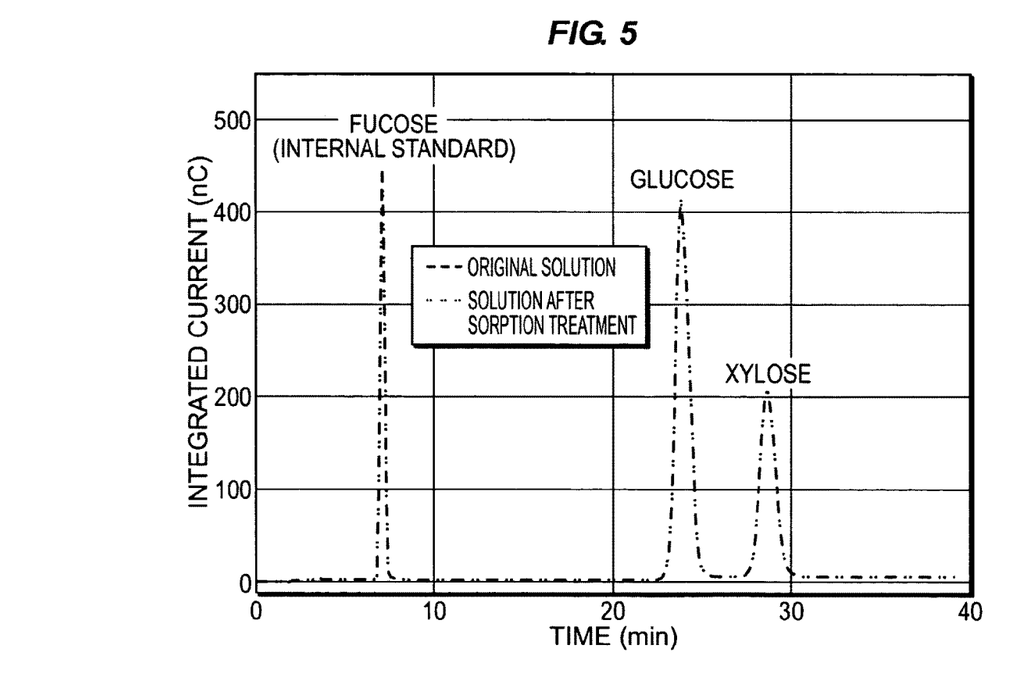
FIG. 5 shows HPAEC analysis of the sorption of P(GMA-TRIM)-AMP on monosaccharides.

The P(GMA-TRIM)-AMP sorbent was designed to selectively remove 2-Methoxy-4-propylphenol, PMP, from the hydrolysis solution of a biomass which contains glucose and xylose. The selective sorption performance of P(GMA-TRIM)-AMP sorbent is shown in FIG. 5. P(GMA-TRIM)-AMP yields no measurable sorption of glucose and xylose, either in the saccharides solutions or in PMP-containing saccharide solutions. The HPAEC curves of the saccharides in the original solutions are identical with that in the solution following sorption studies at 25° C. for 24 h experiment thereby indicating that both glucose and xylose concentration remained unchanged after the sorption experiment. Meanwhile the P(GMA-TRIM)-AMP yields good sorption performance of PMP in solutions with/without saccharides, as will be discussed later. The results indicate that P(GMA-TRIM)-AMP sorbent has good inherent selective affinity to PMP, and can be used as a sorbent to selectively remove phenols from biomass fermentation without loss of saccharides. Thus, other sorbents for selective separation of a specific component from a mixture could be made by, for example, synthesizing a sorbent comprising moieties with chemical structures similar to those of the solute to be selectively removed.

Sorption and Desorption of Phenols

Figure 6:
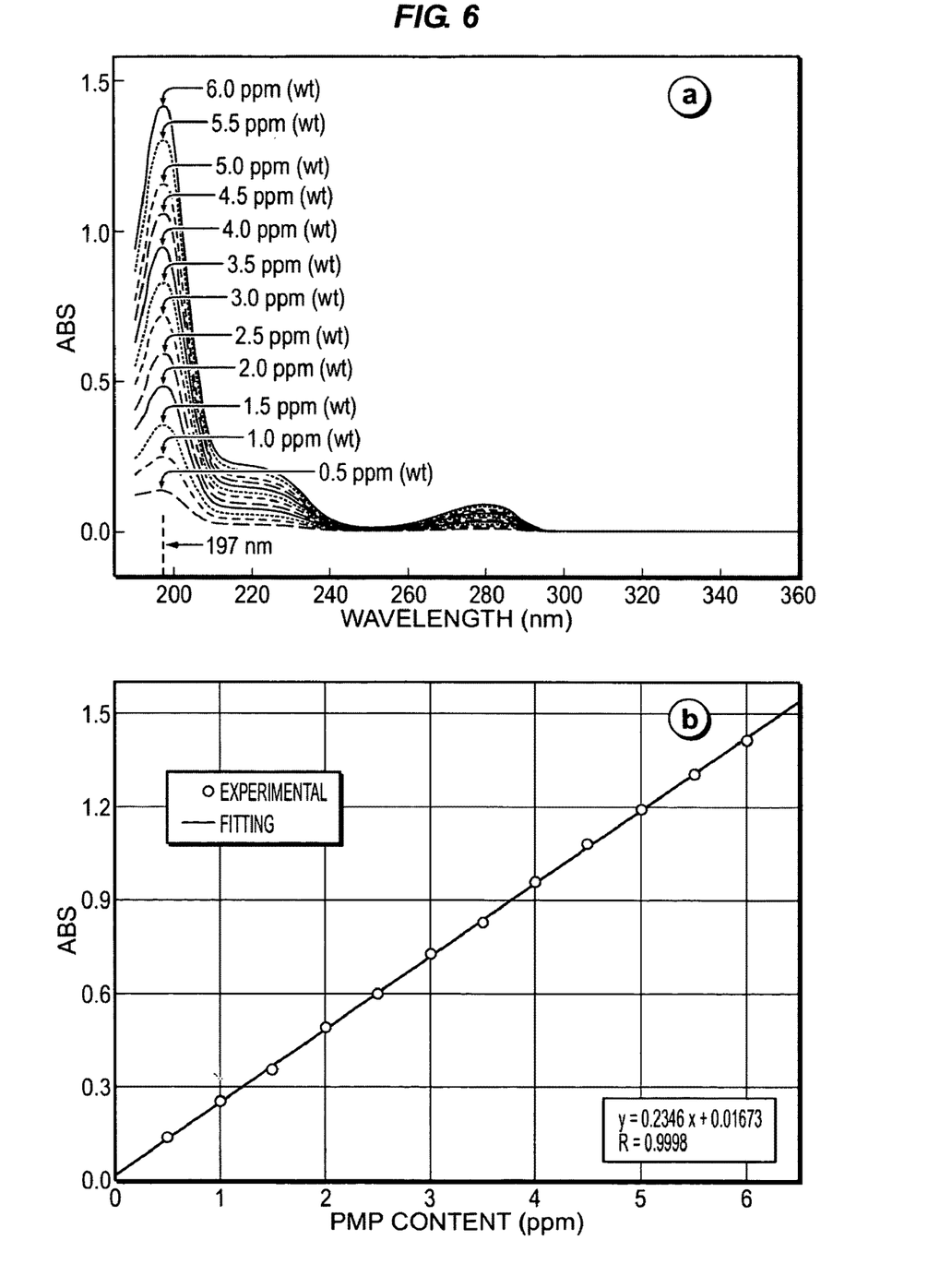
FIG. 6 shows UV-spectrum analysis of PMP: (a) UV absorption, and (b) calibration curve.

PMP has a maximum absorption at 197 nm in UV-spectrum, as shown in FIG. 6*a*. The intensity of the absorption increases with an increase in PMP concentration. Good linearity ($R^2$=0.9998) is apparent between the absorbance and PMP concentration up to a PMP concentration of 6 ppm (beyond which phase separation was observed). As shown in FIG. 6*b*, the calibration curve was used to calculate the concentration of PMP before and after sorption tests. It was observed that both glucose and xylose had no influence on UV spectra of the PMP solution, i.e., the wavelength and absorbance of PMP did not change with the addition of glucose and xylose.

Figure 7:
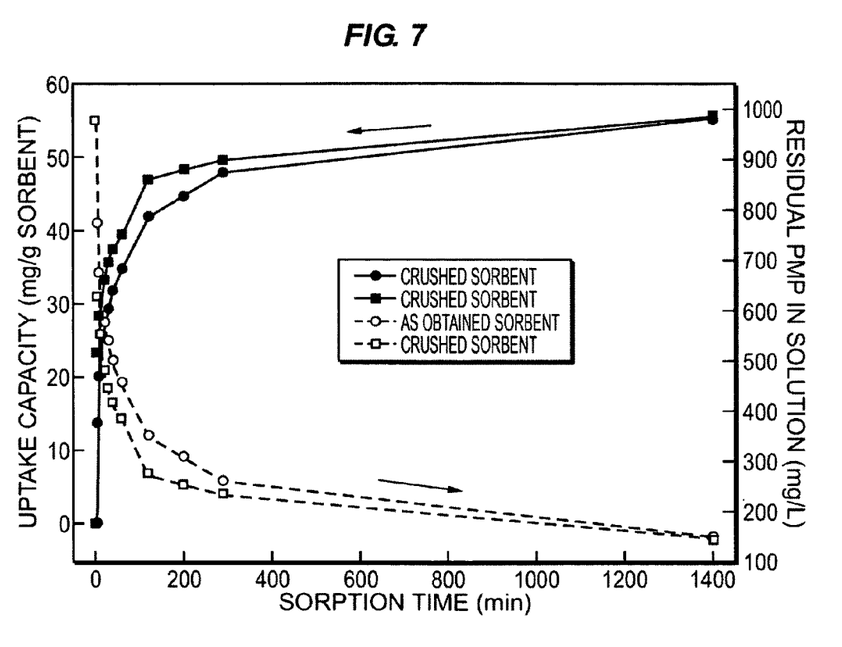
FIG. 7 shows time dependence of sorbent uptake capacity (solid line) and residual PMP in solution (dotted line).

The typical rate of PMP sorption on P(GMA-TRIM)-AMP sorbent at 25° C. is shown in FIG. 7. The uptake of PMP increases markedly within 120 min, especially in the first 5 min, within which half the amount PMP finally taken up at 120 min was sorbed by the sorbent. Beyond 120 min, the sorption uptakes continuously increase slowly with prolonged sorption time. As a result, the residual PMP in solution decreases quickly in 120 min and then decreases slowly. The shell of the sorbent (see FIG. 3) may delay the sorption rate, particularly in the first 10 min. As can be seen in FIG. 7, the sorption capacity of the crushed sorbent increases more quickly than that of uncrushed sorbent; however, the shell has no effect on the saturated sorption capacities. This implies that a porous sorbent without shell might offer faster kinetics, but it would be more difficult to handle. As an alternative a hollow fiber sorbent with porous skin could be made and may be applicable to an industry application.

Figure 8:
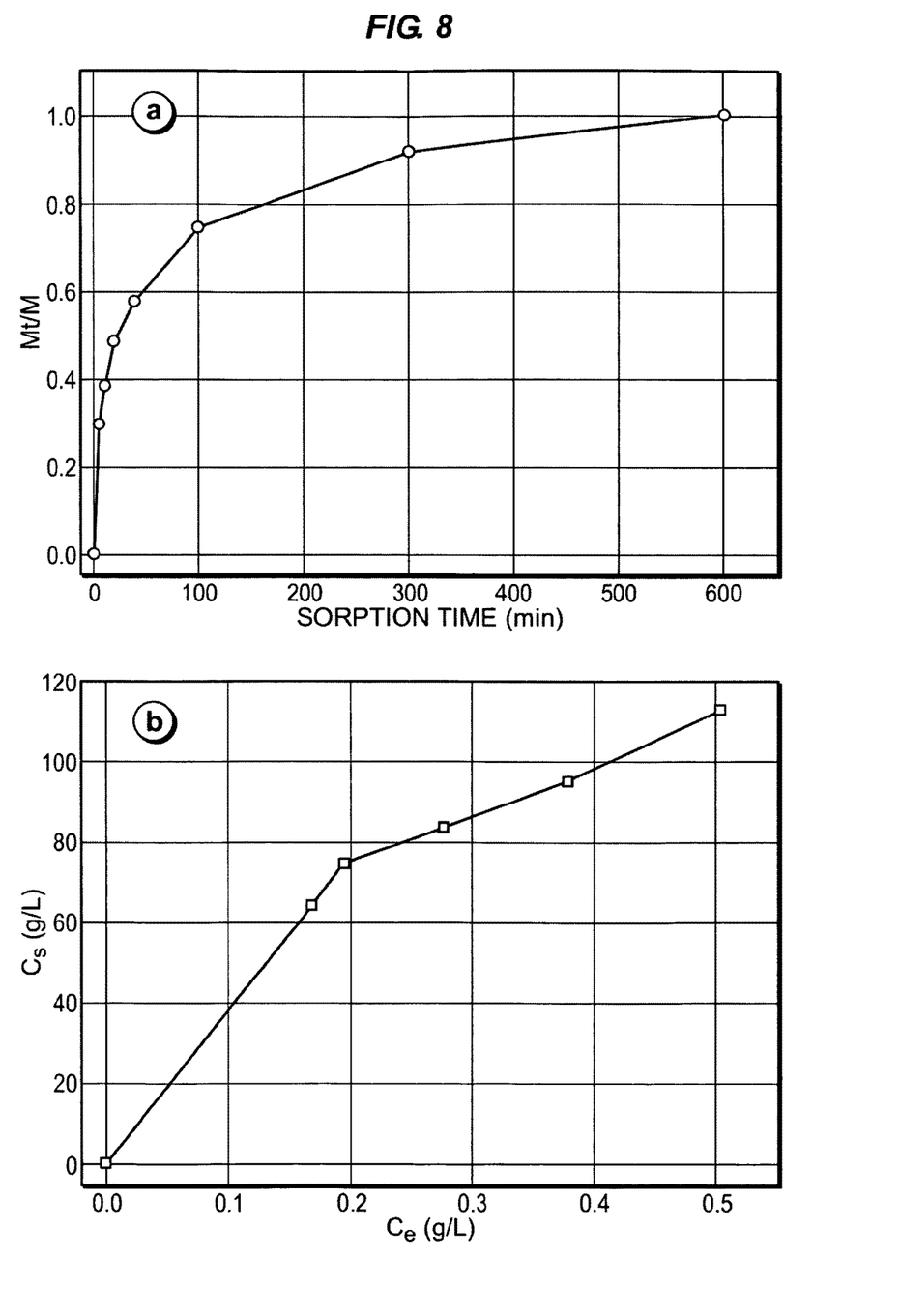
FIG. 8 shows PMP sorption on P(GMA-TRIM)-AMP sorbent: (a) equilibrum time, and (b) partition coefficient.

The kinetics of PMP sorption in P(GMA-TRIM)-AMP sorbent are shown in FIG. 8a, in a plot of the ratio of Mt/M∞ as a function of time, where Mt is the amount of PMP sorbed by the sorbent at the time t, and M∞ is the saturated sorption amount of PMP by the sorbent. Under equilibrium conditions, the PMP in sorbent and in residual solution is shown in FIG. 8b, where $C_s$ was the concentration of PMP in the sorbent, and $C_e$ was the concentration of the residual PMP in solution. The calculated partition coefficient, $K_d = C_s/C_e$, is about 390, indicating a high sorption efficiency.

Figure 9:
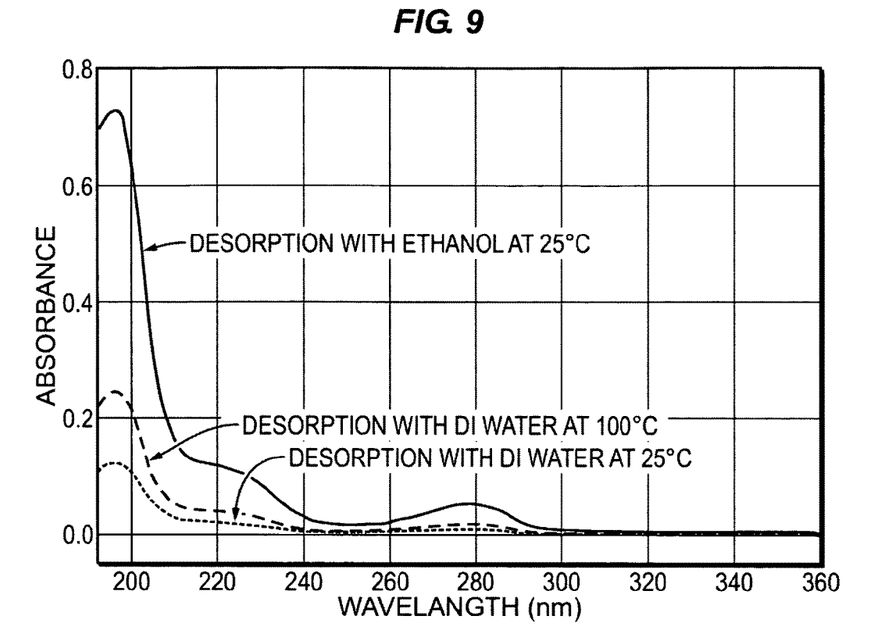
FIG. 9 shows UV spectra of PMP solution from desorption of the saturate sorbed sorbent.
Figure 10:
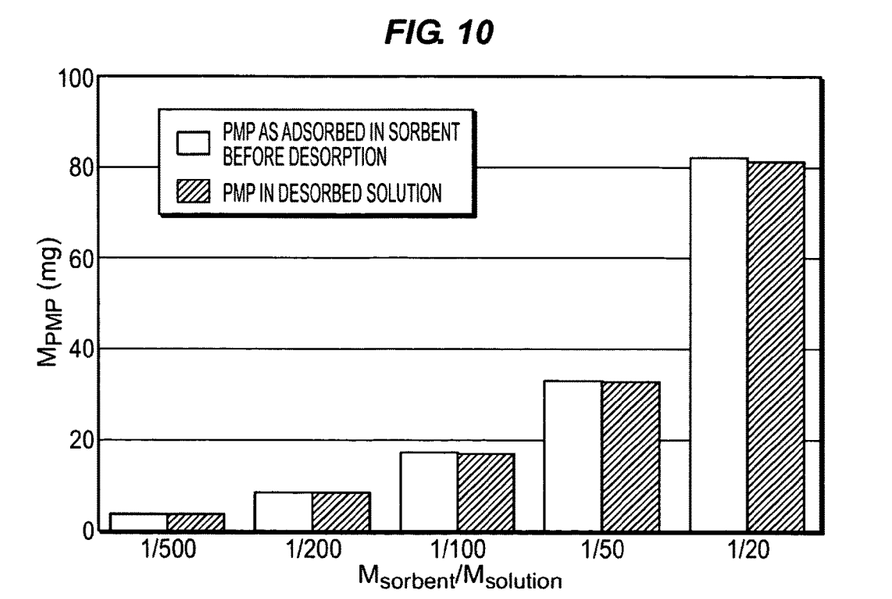
FIG. 10 shows desorption efficiency vs sorbent concentration in desorption solution

The PMP is easily desorbed from the sorbent by an organic solvent, like ethanol or methanol or a mixture. The PMP saturated P(GMA-TRIM)-AMP sorbent was soaked in DI water or ethanol for 30 min, then the desorbed PMP solution was measured by UV spectra. FIG. 9 compares the desorption efficiency of water and ethanol, and indicates that ethanol is effective to remove PMP from the sorbent. In fact with either ethanol or methanol, 95±5% PMP can be desorbed during desorption period of 30 min. The mass ratio of saturated sorbent to ethanol was also varied from 1/500 to 1/20 to determine the desorption efficiency. As shown in FIG. 10 the efficiency was the same for either 1/500 or 1/20 within experimental error. After desorption, the fractional uptake (Φ) of the solution is given by the expression (4) and (5):

$$\Phi = \frac{M_{P.ethanol}}{M_{P.ethanol} + M_{P.sorbent}} = \frac{1}{1 + \frac{1}{\alpha}} \quad (4)$$

$$\alpha = \frac{V_{Ethanol}}{V_{Sorbent} K'_d} \quad (5)$$

The distribution coefficient $K'_d$ is the ratio of the concentration of phenol in sorbent to the equilibrium concentration of desorbed phenol in ethanol, $M_{p\ ethanol}$ is the mass of PMP desorbed in ethanol, $M_{p\ sorbent}$ is the mass of PMP in sorbents, $V_{ethanol}$ and $V_{sorbent}$ are volumes of ethanol and sorbent, respectively.

Therefore, $$\Phi = \frac{1}{1 + \frac{V_{Sorbent} K'_d}{V_{Ethanol}}} \quad (6)$$

Φ can be calculated from FIG. 10. Thus, $K'_d$ can be obtained when $V_{Sorbent}$ and $V_{Ethanol}$ are known. From FIG. 10, Φ is 99.7% when the mass ratio of sorbent to ethanol is 1/100. $K'_d$ is 0.316, much smaller than $K_d$ (390), indicating the good desorption efficiency of ethanol.

Figure 11:
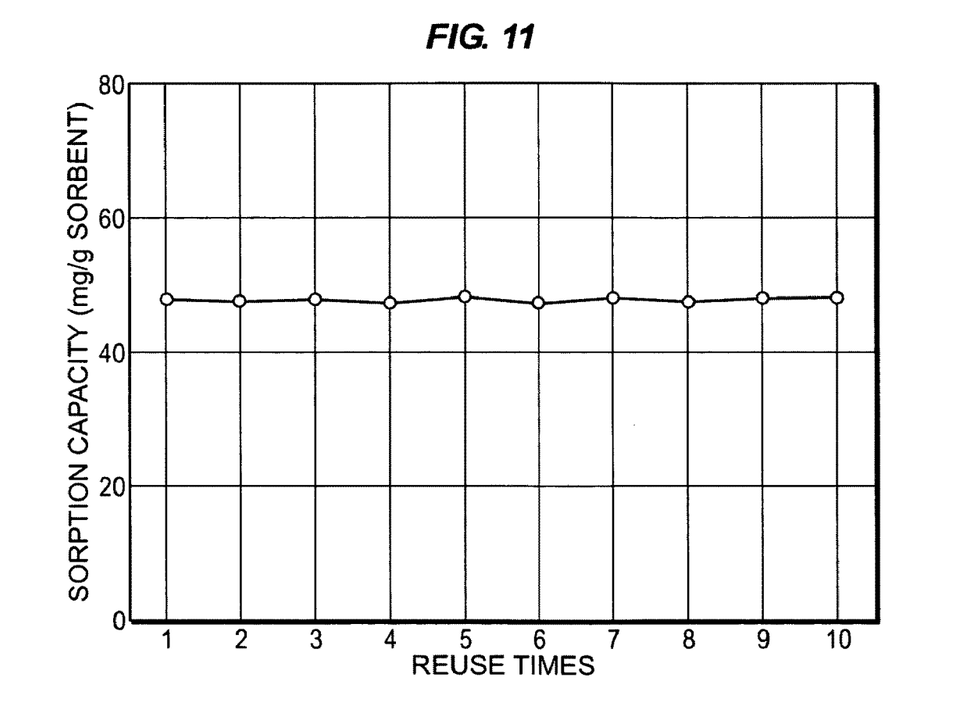
FIG. 11 shows sorption capacity of the sorbent as a function of reuse times.

Durability and/or reusability of the sorbent are often important in, for example, industrial applications. The PMP saturated P(GMA-TRIM)-AMP sorbent was regenerated and reused in separation of PMP, as can be seen in FIG. 11, and it is observed that the sorbent maintained its original sorption capacity even after 10 times of reuse, indicating the feasibility and stability of multiple use of the sorption and desorption of the sorbent in application.

Sorption and Desorption of Other Phenols

Figure 12:
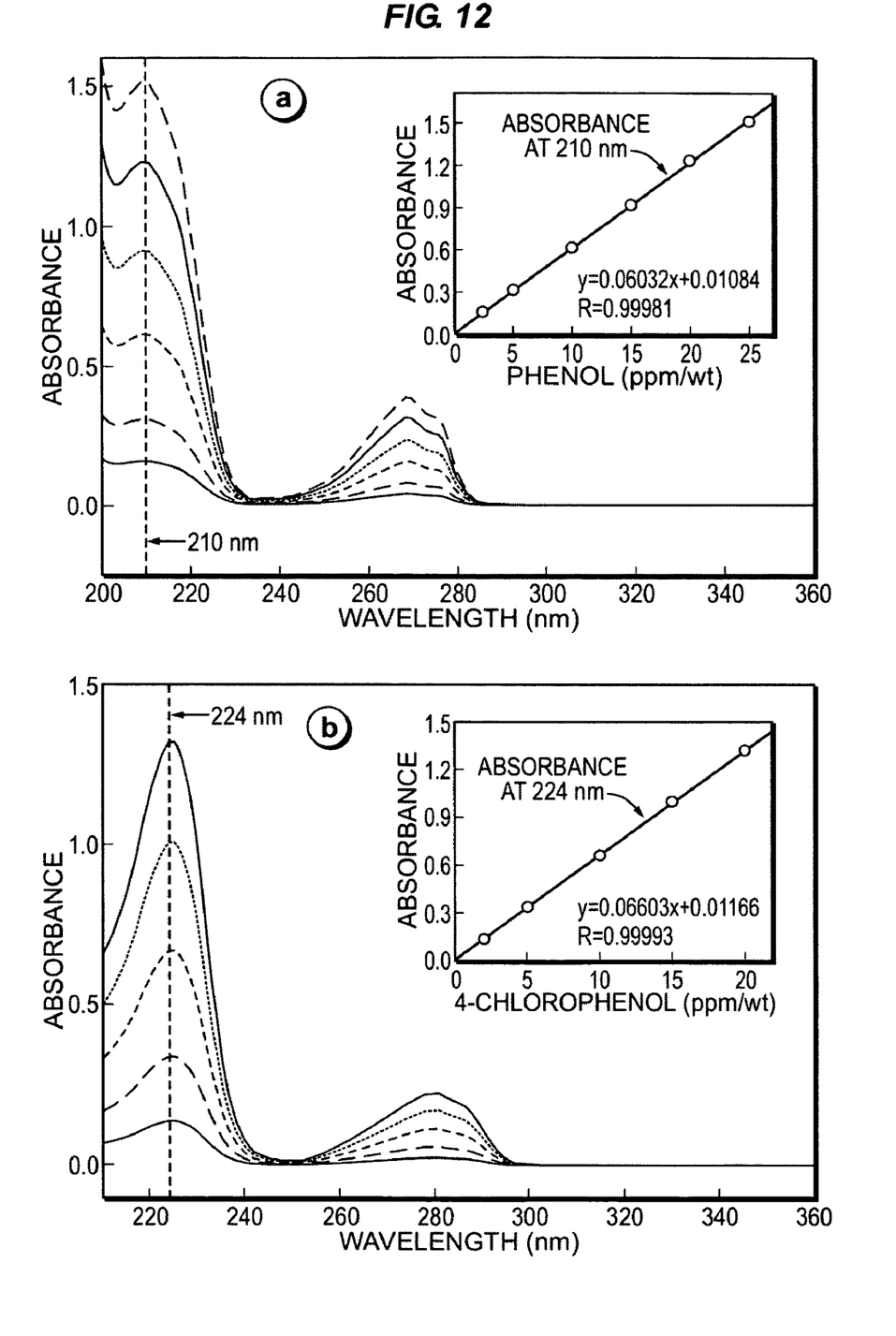
FIG. 12 shows UV-spectrum analysis of phenol (a) and 4-chlorophenol (b) in water solution.

The sorption and desorption of phenol and 4-chlorophenol, which are common pollutants in waste water, also were investigated. FIG. 12a and FIG. 12b shows the UV-spectra of phenol and 4-chlorophenol solution, respectively. Phenol shows a maximum absorption at 210 nm, while 4-chlorophenol is at 224 nm. Like PMP, both phenol and 4-chlorophenol show good linearity between UV absorbance and concentration in the homogeneous solutions. The fitting curves were used to calculate the concentration of phenol and 4-chlorophenol before and after sorption test.

Figure 13:
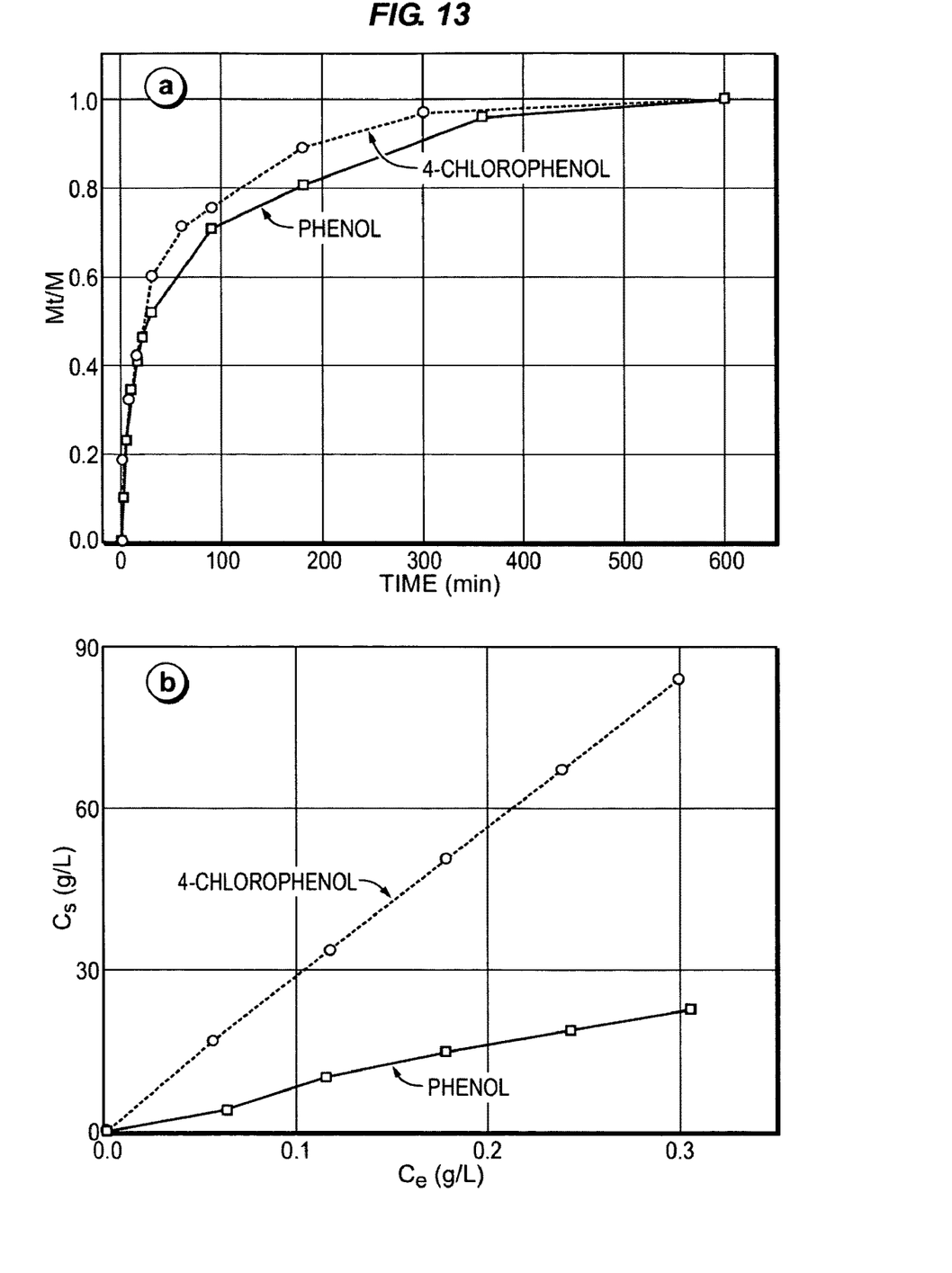
FIG. 13 shows phenol and 4-chlorophenol sorption on P(GMA-TRIM)-AMP sorbent: (a) equilibrium time, and (b) partition coefficient.

As can be seen in FIG. 13a, both phenol and 4-chlorophenol were sorbed on the P(GMA-TRIM)-AMP sorbent quickly in 120 min, then the sorption rate is slowly until the sorbent was saturated with the increasing of time. Under equilibrium condition, the distribution of phenols in sorbents and in residual solution is given in FIG. 13b, the calculated partition coefficient was 80 for phenol, and 280 for 4-chlorophenol. These smaller values of the partition coefficients, versus that of PMP, presumably reflect less similarity with chemical structure of functional groups in P(GMA-TRIM)-AMP sorbent. Similar as the sorbent being saturated with PMP, the sorbents saturated with phenol or 4-chlorophenol could be easily recovered by exchanging with ethanol, and reused.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

All references cited herein are incorporated herein by reference in their entirety to the extent that they are not inconsistent and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

What is claimed is:

1. A composition comprising poly(glycidyl methacrylate-co-trimethylolpropane trimethacrylate) functionalized with a compound having the structure $NH_2—R_1OH$ wherein $R_1$ is a substituted or unsubstituted phenylene.

2. The composition of claim 1 wherein the phenylene is optionally substituted with one or substituents selected from substituted or unsubstituted alkoxy, alkyl, alkenyl, alkynyl, aryl, hydroxyl, and halogen.

3. The composition of claim 1 wherein $R_1$ is m-phenylene optionally substituted with an alkoxy group.

4. The composition of claim 1 wherein $R_1$ is m-phenylene optionally substituted with a methoxy group.

5. The composition of claim 1 wherein poly(glycidyl methacrylate-co-trimethylolpropane trimethacrylate) is functionalized with 5-amino-2-methoxyphenol.

6. The composition of claim 1 wherein the decomposition temperature of the poly(glycidyl methacrylate-co-trimethylolpropane trimethacrylate) functionalized with a compound having the structure $NH_2—R_1OH$ wherein $R_1$ is a substituted or unsubstituted phenylene is higher than the decomposition temperature of the poly(glycidyl methacrylate-co-trimethylolpropane trimethacrylate).

7. The composition of claim 1 wherein at least about 95% by weight of the poly(glycidyl methacrylate-co-trimethylolpropane trimethacrylate) functionalized with a compound having the structure $NH_2$—$R_1OH$ wherein $R_1$ is a substituted or unsubstituted phenylene has a particle size of less than about 850 micrometers.

8. The composition of claim 1 wherein the poly(glycidyl methacrylate-co-trimethylolpropane trimethacrylate) functionalized with a compound having the structure $NH_2$—$R_1OH$ wherein $R_1$ is a substituted or unsubstituted phenylene is in the form of a macroporous bead.

9. The composition of claim 1 wherein the poly(glycidyl methacrylate-co-trimethylolpropane trimethacrylate) functionalized with a compound having the structure $NH_2$—$R_1OH$ wherein $R_1$ is a substituted or unsubstituted phenylene is in the form of a hollow fiber.

* * * * *